United States Patent
Gedenk

(10) Patent No.: US 9,488,245 B2
(45) Date of Patent: Nov. 8, 2016

(54) HYDRAULIC BEARING

(71) Applicant: ContiTech Luftfedersysteme GmbH, Hannover (DE)

(72) Inventor: Volker Gedenk, Hemmingen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 14/452,299

(22) Filed: Aug. 5, 2014

(65) Prior Publication Data

US 2014/0346720 A1 Nov. 27, 2014

Related U.S. Application Data

(63) Continuation of application No. 13/411,155, filed on Mar. 2, 2012, now abandoned, which is a continuation-in-part of application No. PCT/EP2010/062541, filed on Aug. 27, 2010.

(30) Foreign Application Priority Data

Sep. 3, 2009 (DE) .................. 10 2009 043 939

(51) Int. Cl.
  *F16F 13/04* (2006.01)
  *F16F 13/10* (2006.01)
  *F16F 13/18* (2006.01)

(52) U.S. Cl.
  CPC ............... *F16F 13/10* (2013.01); *F16F 13/18* (2013.01)

(58) Field of Classification Search
  CPC .... F16F 13/262; F16F 13/264; F16F 13/105; F16F 13/26; F16F 13/107; F16F 13/266; F16F 13/268; F16F 1/3935; F16F 1/41
  See application file for complete search history.

(56) References Cited

U.S. PATENT DOCUMENTS

| | | | |
|---|---|---|---|
| 3,701,322 A | 10/1972 | Carle | |
| 4,681,306 A | 7/1987 | Hofmann et al. | |
| 4,699,099 A * | 10/1987 | Arai | F16F 13/262 123/192.1 |
| 4,822,009 A * | 4/1989 | Hirchenhain | F16F 13/08 267/140.13 |
| 4,834,349 A | 5/1989 | Arai et al. | |
| 4,869,478 A | 9/1989 | Bouhours et al. | |
| 4,969,632 A * | 11/1990 | Hodgson | F16F 13/262 267/140.11 |
| 5,009,403 A | 4/1991 | Kato et al. | |
| 5,277,409 A | 1/1994 | Goto et al. | |

(Continued)

FOREIGN PATENT DOCUMENTS

| JP | 4-71837 A | 3/1992 |
|---|---|---|
| JP | 8-159209 A | 6/1996 |

OTHER PUBLICATIONS

International Search Report dated Oct. 22, 2010 of international application PCT/EP 2010/062541 on which this application is based.

*Primary Examiner* — Bradley King
*Assistant Examiner* — Stephen Bowes
(74) *Attorney, Agent, or Firm* — Walter Ottesen, P.A.

(57) ABSTRACT

The invention is directed to a hydraulic bearing which includes two connecting pieces, an annular rubber-elastic spring, a hydraulic chamber unit made of a working chamber and a compensating chamber and a partition unit having a connecting channel between the working chamber and the compensating chamber. The partition unit is configured as a disc and is disposed within the vertical elevation of the annular rubber-elastic spring and one of the connecting pieces.

18 Claims, 5 Drawing Sheets

(56) References Cited

U.S. PATENT DOCUMENTS

| | | | |
|---|---|---|---|
| 5,356,123 A | 10/1994 | Hamada et al. | |
| 5,411,243 A * | 5/1995 | Gennesseaux | H01F 7/145 188/322.13 |
| 5,779,231 A | 7/1998 | Okazaki et al. | |
| 5,947,456 A | 9/1999 | Aoki | |
| 6,017,024 A | 1/2000 | Muramatsu et al. | |
| 6,082,717 A * | 7/2000 | Nanno | F16F 13/20 267/140.14 |
| 6,254,069 B1 | 7/2001 | Muramatsu et al. | |
| 6,308,942 B1 * | 10/2001 | Ersoy | F16F 13/18 267/140.13 |
| 6,595,504 B2 | 7/2003 | Gedenk | |
| 2002/0117788 A1 | 8/2002 | West | |

\* cited by examiner

HYDRAULIC BEARING

CROSS REFERENCE TO RELATED APPLICATIONS

This application is a continuation application of U.S. patent application Ser. No. 13/411,155, filed Mar. 2, 2012, which is, in turn, a continuation-in-part application of international patent application PCT/EP 2010/062541, filed Aug. 27, 2010, designating the United States and claiming priority from German application 10 2009 043 939.0, filed Sep. 3, 2009, and the entire content of the above applications is incorporated herein by reference.

FIELD OF THE INVENTION

The invention relates to a hydraulic bearing with hydraulic damping, which has an annular rubber-elastic spring element, that is, a spring element of an elastomer such as rubber or a plastic with rubber-elastic behavior, as specified for example by DIN 7724. The associated rubber-elastic spring element is connected, on the one hand, to the sprung body and, on the other hand, to the unsprung mass by way of respective upper and lower, likewise annular, connecting pieces, which are generally vulcanized on. If such a hydraulic bearing is used as a chassis spring of a vehicle, one connecting piece is connected to the body as a sprung body, while the other connecting piece is connected to the chassis as an unsprung mass. The hydraulic bearing also comprises a hydraulic chamber unit, which comprises a working chamber and a compensating chamber and is surrounded by the annular spring element and/or the annular connecting pieces in such a way that inward deflection causes the volume of the working chamber filled with a damping medium to change, and further comprises a partition unit provided with at least one connecting channel between the working chamber and the compensating chamber.

BACKGROUND OF THE INVENTION

Springs of the generic type, also known as hydraulic springs, are known in the prior art. For instance, U.S. Pat. No. 3,701,322 discloses a rubber spring with fluid damping for rail vehicles in which two bores are arranged as throttling bores in the partition or damper plate between the working chamber arranged at the bottom and the compensating chamber lying above. When there is inward deflection of the hydraulic springs shown there, the working chamber is reduced in size, as a result of which the fluid in the working chamber is forced through the throttling bores and the resultant dissipation has a damping effect. However, the formation of the throttling bores disadvantageously does not produce any appreciable damping. Rather, such a throttle produces little damping, which moreover only occurs at high frequencies.

U.S. Pat. No. 6,595,504 discloses a hydraulic spring with a damper which has a sufficient damping effect under greatly differing loads and frequencies on account of the relatively long damping channels in the partition unit. Disadvantageously, however, the overall height is relatively great here.

SUMMARY OF THE INVENTION

Therefore, it is an object of the invention to provide a hydraulic bearing, that is, a rubber-elastic spring with hydraulic damping, which provides sufficient and adjustable damping in different frequency and loading ranges and nevertheless only has an overall size that is as small as possible.

The hydraulic bearing of the invention is interposed between a sprung body and an unsprung mass. The hydraulic bearing includes: a lower annular connecting piece connecting the hydraulic bearing to the unsprung mass; an upper annular connecting piece connecting the hydraulic bearing to the sprung body; an annular rubber-elastic spring defining a vertical structural elevation and being connected to the unsprung mass via the lower annular connecting piece and to the sprung body via the upper annular connecting piece; a hydraulic chamber unit including a working chamber and a compensating chamber; the hydraulic chamber unit being surrounded by the annular rubber-elastic spring and/or the annular connecting pieces so as to cause the volume of the working chamber filled with a damping medium to change in response to a deflection of the hydraulic bearing; a partition unit disposed between the working chamber and the compensating chamber; the partition unit including a disc defining a disc plane and the disc having a connecting channel formed in the plane; the annular connecting pieces having respective vertical structural elevations; the partition unit being arranged within the vertical structural elevation of the annular rubber-elastic spring and the vertical structural elevation of one of the annular connecting pieces; the one annular connecting piece having an end facing away from the partition unit; and, the partition unit being disposed within the one annular connecting piece so as to cause the compensating chamber to be configured between the partition unit and the end of the one annular connecting piece.

The partition unit is formed as at least one disc with a connecting channel extending in the plane of the disc and is arranged within the overall vertical elevation of the spring element and a connecting piece, that is, within the extent of the height of these parts in the axis of the spring, that is, the axis along which the spring force acts. At the same time, the partition unit is arranged within the connecting piece in such a way that the compensating chamber is formed between the partition unit and the end of the connecting piece that is remote from the latter.

Such an arrangement of the components and the consequent use of the "inner space" of the spring as a space for further functional elements produce an extremely compact type of construction.

An advantageous feature is that the rubber-elastic spring element is formed as an upwardly open hollow cone, which is connected, on the one hand, to the sprung body and, on the other hand, to the unsprung mass by way of an upper connecting piece, vulcanized on its inner cone, and a lower connecting piece, vulcanized on its outer cone, and in which the partition unit is arranged within the upper connecting piece in such a way that the compensating chamber is formed between the partition unit and the end of the upper connecting piece. The conical form not only has the effect of optimizing the spring properties, it also provides a larger cavity as an "inner structural space" within the components—assuming concentric arrangement—with the same load-bearing capacity of the spring, so that the structural design and production are simplified.

A further advantageous feature is that the connecting piece having the partition unit has a seat or a recess for receiving the partition unit formed as a disc, that is, for example a milled relief or a turned offset. This produces reliable positioning during production and operationally secure fixing.

A further advantageous feature is that the partition unit comprises multiple discs arranged one above the other, the channels of which are connected in such a way that they communicate with one another. This allows the damping to be adapted to different loads and frequencies in an extremely simple way already during production, by way of the overall length of the damping channel connecting the working chamber and the compensating chamber, which is in actual fact provided by the number of discs, that is specifically it is adapted just by adding further discs. This presupposes that the dimensions match and that prepared/pre-milled connecting pieces are available.

A further advantageous feature is that the length of the overall connecting channel formed by multiple discs can be changed by rotating the discs. This either allows the rubber-elastic spring element also to be adapted to changed damping properties under different loads and frequencies after production, or else allows it to be adapted by uniform "standard discs" to different applications just by rotating them during production.

A further advantageous feature is that the connecting channels located in the discs are milled in on one side. This allows the corresponding channels to be produced in a particularly easy and low-cost way. The respective covering of the channels then takes place at least partially by the adjacently lying disc or connecting piece.

A further advantageous feature is that the compensating space is delimited by a cover at the end of the connecting piece. In an improvement of the "open" configuration, which in any case is only possible when the compensating space is formed in the upper connecting piece, the fluid that is used for the damping is particularly well protected against the ingress of foreign bodies or moisture. The same applies to a further advantageous feature, which is that the compensating space is delimited by a membrane arranged within the connecting piece. With such a membrane, which is additionally especially elastic, however, an upside-down type of construction can also be realized, one in which the compensating space is arranged at the bottom.

A further advantageous feature is that the rubber-elastic spring element is formed as a multilayered spring, that is, as a rubber-metal element. This increases the load-bearing capacity of the spring, so that the inward deflection, the changing of the volume of the working chamber and the damping can be designed for particularly high loads, which is particularly necessary for example in the case of rail vehicles, which must absorb load differences of approximately 1:5 between the unloaded state and the loaded state.

The properties of the hydraulic bearing according to the invention with regard to the damping and the overall size can accordingly be used particularly well in the case of a chassis for a rail vehicle. The use of a hydraulic bearing incorporating a rubber-elastic spring element as a machine mounting also offers advantages, since here too the overall size and the damping are the essential properties.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
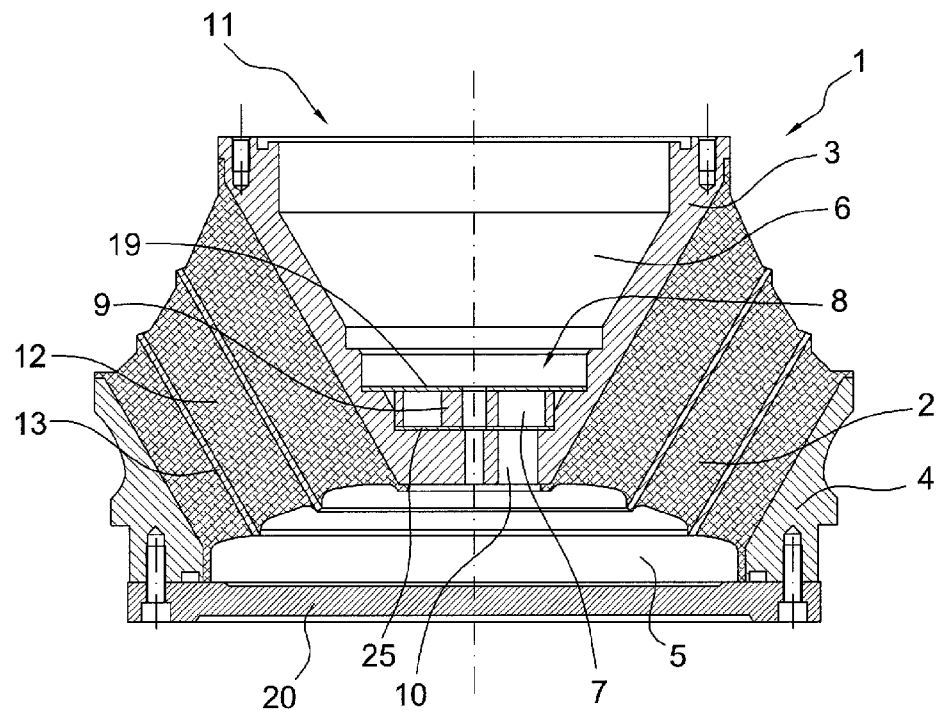
FIG. 1 shows a hydraulic bearing according to the invention.

FIG. 1 shows a hydraulic bearing 1 with hydraulic damping for a chassis of a rail vehicle. The hydraulic bearing comprises an annular rubber-elastic spring element 2, which is connected, on the one hand, to the sprung body and, on the other hand, to the unsprung mass by way of respective upper and lower, likewise annular, connecting pieces 3 and 4. The sprung body and the unsprung mass, that is, the body and the chassis of the rail vehicle, are not represented in any more detail here.

Figure 4:
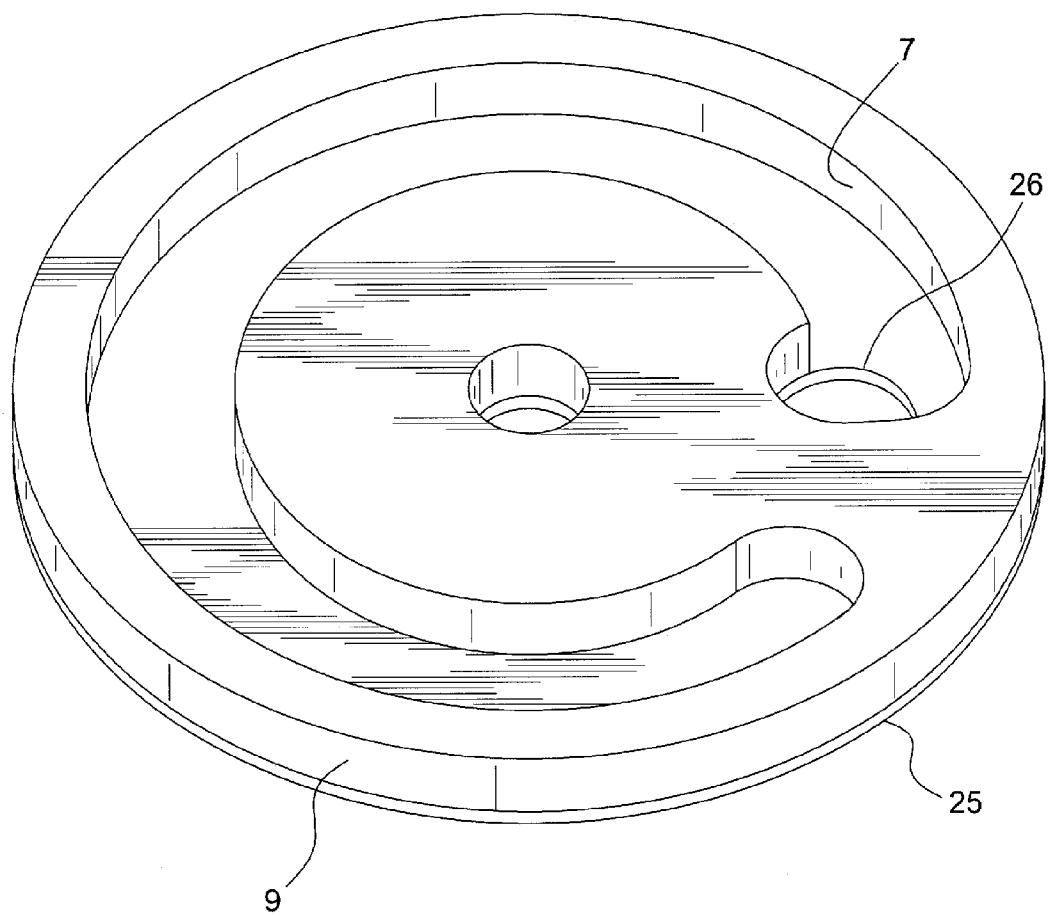
FIG. 4 is a perspective view of the disc of the pa unit of the hydraulic bearing of FIG. 1.

The hydraulic bearing 1 also has a hydraulic chamber unit, which comprises a working chamber 5 and a compensating chamber 6 and is surrounded by the annular spring element 2 and the annular connecting pieces 3 and 4 in such a way that inward deflection causes the volume of the working chamber 5 filled with hydraulic oil as damping medium to change. There is likewise a partition unit 8, which is provided with at least one connecting channel 7 between the working chamber 5 and the compensating chamber 6 and is formed as at least one disc 9 with a connecting channel 7 extending in the plane of the disc 9 as shown, for example, in FIG. 4.

The upper connecting piece 3 has, in this case, a corresponding bore 10 through which the hydraulic oil can enter the connecting channel 7. The disc 9 is shown seated on thin disc 25 having an aperture 26 communicating with connecting bore 10 formed in the connecting piece 3. The connecting channel 7 is a through slot with a thin disc 25 defining the base of the channel. The upper connecting piece 3 is therefore formed as a compact pot-shaped body and can consequently be produced correspondingly easily and accurately.

Inward deflection causes the volume of the working chamber 5 filled with hydraulic oil as damping medium to change, or be reduced in size, as hydraulic oil flows via the bore 10 and the connecting channel 7 out of the working chamber 5 into the compensating chamber 6 and produces a damping action caused by the dissipation/fluid friction produced by the flow in the connecting channel 7.

The partition unit 8 is arranged within the overall vertical elevation of the spring element 2 and the connecting piece 3 in such a way that the compensating chamber 6 is formed between the partition unit 8 and the end 11 of the connecting piece 3 that is remote from the partition unit 8.

The rubber-elastic spring element 2 is constructed as a multilayered spring, that is, as a rubber-metal element, and is formed as an upwardly open hollow cone. Accordingly, the rubber parts 12, which are reinforced with metal rings 13, can be seen in FIGS. 1 to 3.

The rubber-elastic spring element 2 is connected, on the one hand, to the sprung body and, on the other hand, to the unsprung mass (not shown) by way of the upper connecting piece 3, vulcanized on its inner cone, and by way of the lower connecting piece 4, vulcanized on its outer cone.

The connecting piece 3, which includes the partition unit 8, is provided with a seat(s) or a recess(es) for receiving one or more discs 9, 14 and 15, which singly or together form the partition unit. FIG. 1 shows a hydraulic bearing 1, which is provided with one disc 9, while FIG. 2 shows a hydraulic bearing 21, which is provided with three discs 9, 14 and 15.

The partition unit 16, consisting of three discs 9, 14 and 15, is constructed in such a way that the channels of the discs 9, 14 and 15 are connected so that they communicate with one another, and consequently provide a long connecting channel 17.

Figure 5:
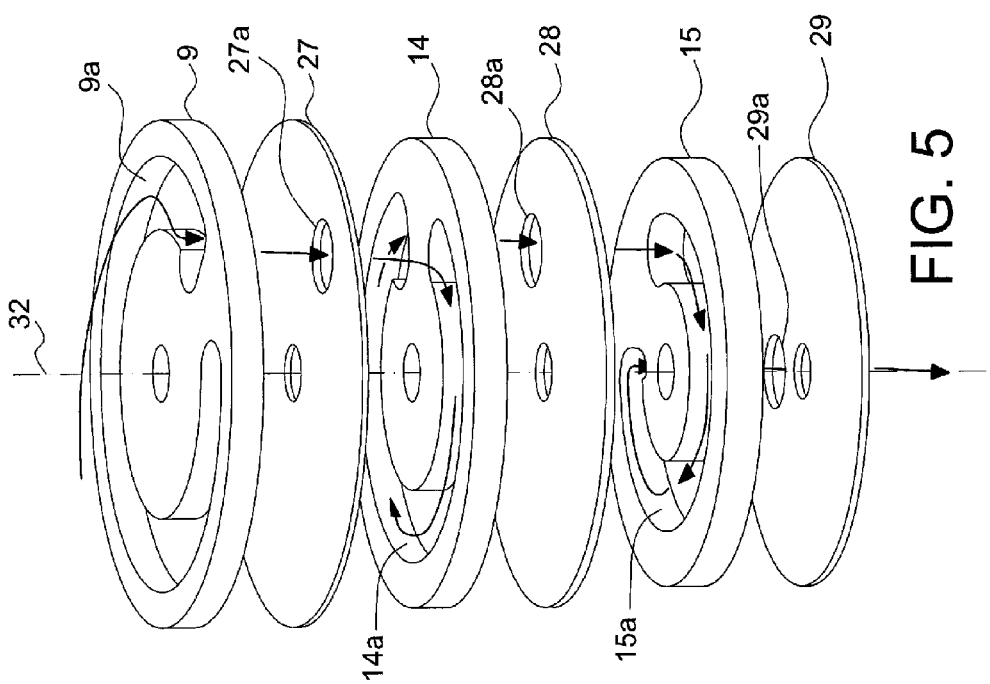
FIG. 5 is an exploded perspective view of the partition unit of FIGS. 2 and 3 and shows the flow of hydraulic oil passing from the compensating chamber to the working chamber of the hydraulic bearing.

The connecting channel 17 is made up of channel segments in the respective discs (9, 14, 15) identified in FIG. 5 by reference numerals 9a, 14a and 15a. The thick discs 9, 14 and 15 rest upon respective thin discs 27, 28 and 29. The thin discs 27, 28 and 29 have respective apertures 27a, 28a and 29a through which the hydraulic oil flows from one channel segment to the next as the hydraulic oil flows from the compensating chamber 6 to the working chamber 5 as indicated by the arrows in FIG. 5.

Figure 2:
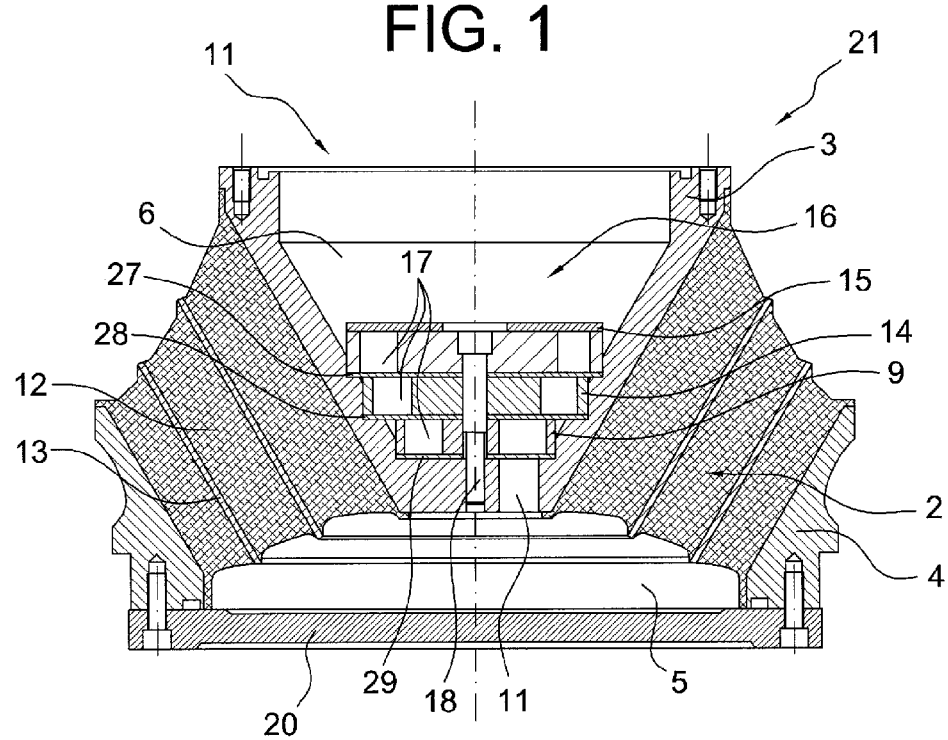
FIG. 2 shows another embodiment of a hydraulic bearing according to the invention wherein a partition unit comprises three discs.

The long connecting channel 17 allows the damping to be adapted to different loads and frequencies in a very simple manner in the case of both versions shown in FIG. 1 and FIG. 2, by way of the overall length of the connecting channel, without changing the connecting piece 3. This serves the "same parts principle" in the production of different spring elements.

Figure 6:
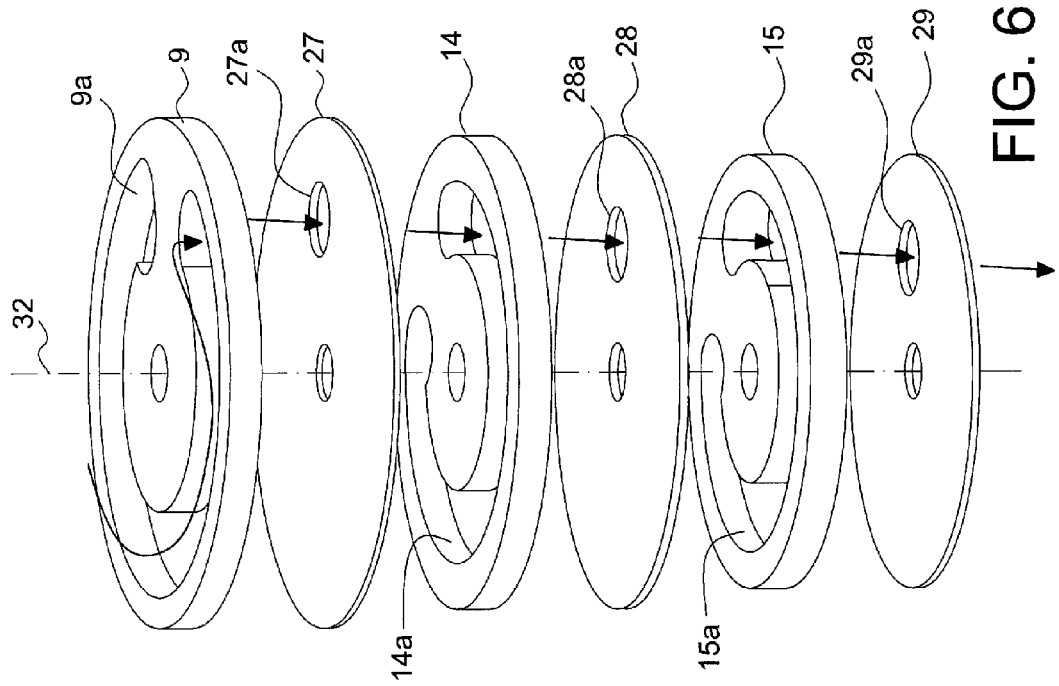
FIG. 6 shows the partition unit of FIGS. 2 and 3 with the discs thereof rotated to shorten the path of the hydraulic oil from the compensating chamber to the working chamber; and, FIG. 7 is a perspective view of a disc wherein the channel formed therein is milled from one side leaving a channel base within the disc.

The three discs 9, 14 and 15 can be rotated about longitudinal axis 32 with respect to one another, so that the length of the composite connecting channel 17 formed by the three channel segments 9a, 14a and 15a can be changed. The thin discs 27, 28 and 29 are also rotated as shown by comparing their respective positions in FIGS. 5 and 6.

It is also possible to use only two discs, for example the discs 9 and 14, which are rotated to a corresponding length of the connecting channel 17 and then fixed in order to achieve further adapted damping properties.

The connecting channel segments 9a, 14a and 15a located here in the thick discs 9, 14 and 15 are not milled in on one side but are through slots with the apertured thin discs 27, 28 and 29 sandwiched together with the thick discs. The discs are fixed in the connecting piece 3 by way of a central threaded fastener 18. The single disc 9 in FIG. 1 is likewise a disc having a channel 7 defined by a through slot and is fixed in the connecting piece 3 by an outer thin disc 19 having an aperture to permit the connecting channel 7 to communicate with the compensating chamber 6.

In the exemplary embodiments represented in FIG. 1 and FIG. 2, the compensating chamber is upwardly open, while the working chamber 5 is closed by a cover 20 at the end of the connecting piece 4.

Figure 3:
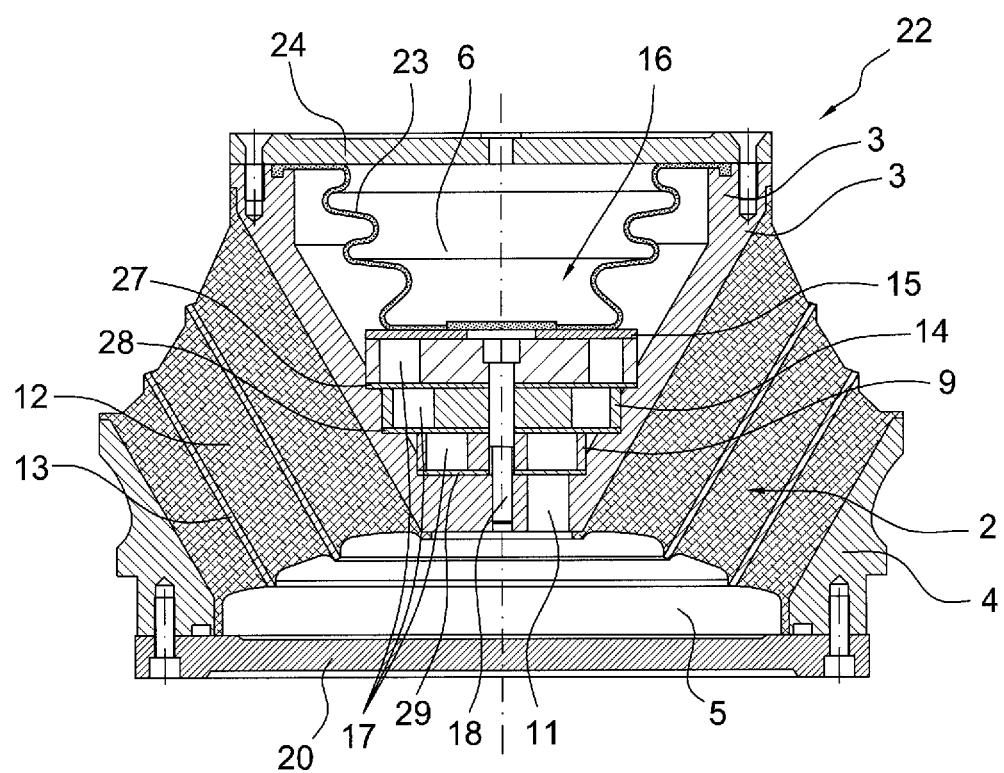
FIG. 3 shows a further embodiment of a hydraulic bearing according to the invention wherein the partition unit comprises three discs.

FIG. 3 shows a further embodiment of a hydraulic bearing 22 with a partition unit 16 consisting of three discs in which the compensating chamber 6 is delimited by a membrane 23 arranged within the connecting piece 3 and is closed by a further cover 24. As a compact element that is closed on all sides, the hydraulic bearing 22 is therefore well protected against the ingress of foreign bodies or moisture and cannot be damaged during transport or installation.

Figure 7:
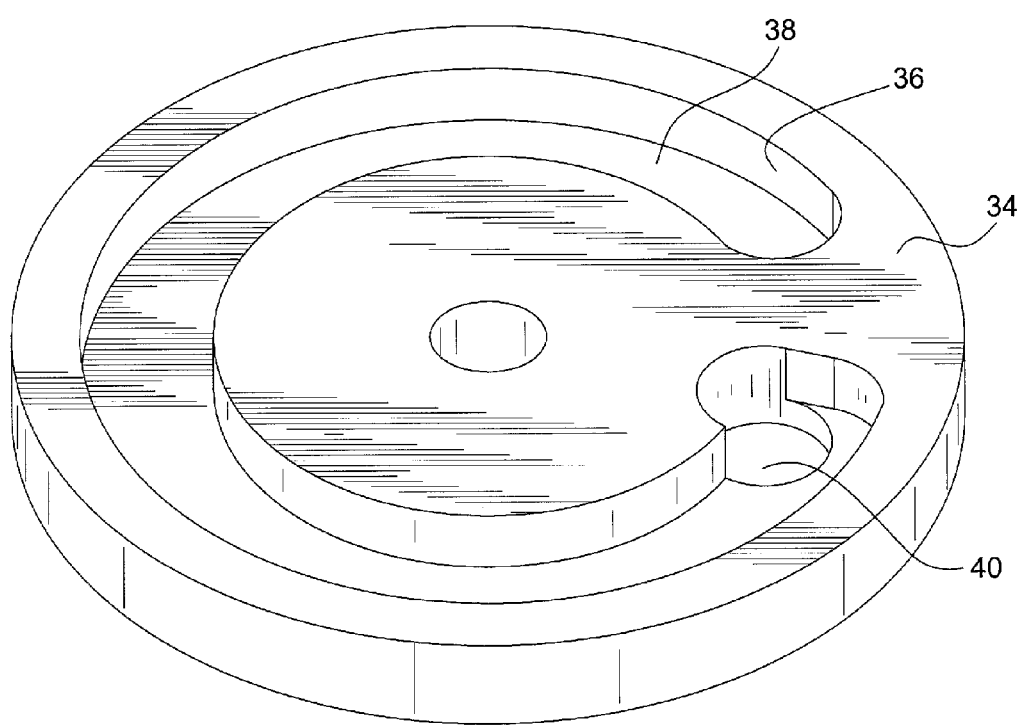

It is also possible to configure the thick disc as shown in FIG. 7 wherein the thick disc 34 is provided with a channel 36 formed by milling the disc from one side and leaving a channel base 38 within the disc. The milled channel 36 ends in an aperture 40. The need for a thin disc disposed between mutually adjacent thick discs is thereby obviated.

It is understood that the foregoing description is that of the preferred embodiments of the invention and that various changes and modifications may be made thereto without departing from the spirit and scope of the invention as defined in the appended claims.

LIST OF DESIGNATIONS

Part of the Description

1 Hydraulic bearing
2 Rubber-elastic spring element
3 Connecting piece
4 Connecting piece
5 Working chamber
6 Compensating chamber
7 Connecting channel
8 Partition unit
9 Disc with connecting channel
9a Connecting channel segment
10 Bore
11 Upper end of the connecting piece 3
12 Rubber part
13 Metal ring
14 Disc with connecting channel
14a Connecting channel segment
15 Disc with connecting channel
15a Connecting channel segment
16 Partition unit
17 Connecting channel
18 Screw fitting or threaded fastener
19 Outer disc
20 Cover
21 Hydraulic bearing
22 Hydraulic bearing
23 Membrane
24 Cover
25 Thin disc
26 Aperture
27 Thin disc
27a Aperture
28 Thin disc
28a Aperture
29 Thin disc
29a Aperture
32 Longitudinal axis
34 Thick disc
36 Milled channel
38 Channel base
40 Aperture

What is claimed is:

1. A hydraulic bearing interposed between a sprung body and an unsprung mass comprising:
   a lower annular connecting piece connecting said hydraulic bearing to said unsprung mass;
   an upper annular connecting piece connecting said hydraulic bearing to said sprung body;
   an annular rubber-elastic spring defining a vertical structural elevation and being connected to said unsprung mass via said lower annular connecting piece and to said sprung body via said upper annular connecting piece;

a hydraulic chamber unit including a working chamber and a compensating chamber;

said working chamber and said compensating chamber both being surrounded by said annular rubber-elastic spring;

said hydraulic chamber unit being configured to cause the volume of said working chamber filled with a damping medium to change in response to a deflection of said hydraulic bearing;

a partition unit disposed between said working chamber and said compensating chamber;

said partition unit including a plurality of discs defining respective planes and being stacked one atop the other and said discs having respective channel segments disposed in corresponding ones of said planes;

said channel segments conjointly defining a connecting channel connecting said working chamber with said compensating chamber with said channel segments communicating one with the other;

said annular connecting pieces having respective vertical structural elevations;

said partition unit being arranged within said vertical structural elevations of said annular rubber-elastic spring;

one annular connecting piece having an end facing away from said partition unit;

said partition unit being disposed within said one annular connecting piece so as to cause said compensating chamber to be configured between said partition unit and said end of said one annular connecting piece; and, said compensating chamber having a constant volume and being entirely surrounded in a radial direction by said one annular connecting piece.

2. The hydraulic bearing of claim 1, further comprising a cover at said end of said one annular connecting piece to delimit said compensating chamber so as to protect said damping medium from the ingress of foreign bodies or moisture.

3. The hydraulic bearing of claim 2, wherein:
said annular rubber-elastic spring has a conical shape opening upwardly and an outer conical surface facing toward said lower connecting piece and an inner conical surface facing toward said upper connecting piece;
said annular rubber-elastic spring is vulcanized to said upper connecting piece at said inner conical surface and is vulcanized to said lower connecting piece at said outer conical surface;
said one connecting piece is said upper connecting piece; and,
said partition unit is arranged within said upper connecting piece so as to cause said compensating chamber to be configured between said partition unit and said end of said one connecting piece.

4. The hydraulic bearing of claim 1, wherein said discs conjointly define a rotational axis and are mounted so as to be shiftable angularly about said rotational axis so as to cause a change in the length of said connecting channel to adapt the damping provided by said damping medium to a particular load and frequency.

5. The hydraulic bearing of claim 1, wherein said channel segments are milled into corresponding ones of said discs from one side thereof.

6. The hydraulic bearing of claim 1, wherein said one annular connecting piece is said upper annular connecting piece and said cover is a top cover; and, wherein said hydraulic bearing further comprises a bottom cover attached to said lower annular connecting piece so as to delimit said working chamber; and, said top and bottom covers, said upper and lower connecting pieces and said annular rubber-elastic spring conjointly define a compact hydraulic bearing unit closed on all sides.

7. The hydraulic bearing of claim 1, wherein said annular rubber-elastic spring is configured as a layered spring.

8. The hydraulic bearing of claim 7, wherein said spring is formed as an upwardly open hollow cone and has a plurality of rubber parts alternating with a plurality of metal parts.

9. A hydraulic bearing interposed between a sprung body and an unsprung mass comprising:
a lower annular connecting piece connecting said hydraulic bearing to said unsprung mass;
an upper annular connecting piece connecting said hydraulic bearing to said sprung body;
an annular rubber-elastic spring defining a vertical structural elevation and being connected to said unsprung mass via said lower annular connecting piece and to said sprung body via said upper annular connecting piece;
a hydraulic chamber unit including a working chamber and a compensating chamber;
said hydraulic chamber unit being surrounded by said annular rubber-elastic spring and/or said annular connecting pieces so as to cause the volume of said working chamber filled with a damping medium to change in response to a deflection of said hydraulic bearing;
a partition unit disposed between said working chamber and said compensating chamber;
said partition unit including a plurality of discs defining respective planes and being stacked one atop the other and said discs having respective channel segments disposed in corresponding ones of said planes;
said channel segments conjointly defining a connecting channel connecting said working chamber with said compensating chamber with said channel segments communicating one with the other;
said annular connecting pieces having respective vertical structural elevations;
said partition unit being arranged within said vertical structural elevation of said annular rubber-elastic spring;
one annular connecting piece having an end facing away from said partition unit;
said partition unit being disposed within said one annular connecting piece so as to cause said compensating chamber to be configured between said partition unit and said end of said one annular connecting piece; and,
said compensating chamber having a constant volume and being entirely surrounded in a radial direction by said one annular connecting piece.

10. The hydraulic bearing of claim 9, wherein said discs conjointly define a rotational axis and are mounted so as to be shiftable angularly about said rotational axis so as to cause a change in the length of said connecting channel to adapt the damping provided by said damping medium to a particular load and frequency.

11. The hydraulic bearing of claim 9, wherein said channel segments are milled into corresponding ones of said discs from one side thereof.

12. The hydraulic bearing of claim 9, wherein said annular rubber-elastic spring is configured as a layered spring.

13. The hydraulic bearing of claim 12, wherein said spring is formed as an upwardly open hollow cone and has a plurality of rubber parts alternating with a plurality of metal parts.

14. A hydraulic bearing interposed between a sprung body and an unsprung mass comprising:
   a lower annular connecting piece connecting said hydraulic bearing to said unsprung mass;
   an upper annular connecting piece connecting said hydraulic bearing to said sprung body;
   an annular rubber-elastic spring defining a vertical structural elevation and being connected to said unsprung mass via said lower annular connecting piece and to said sprung body via said upper annular connecting piece;
   a hydraulic chamber unit including a working chamber and a compensating chamber;
   said working chamber and said compensating chamber both being surrounded by said annular rubber-elastic spring;
   said hydraulic chamber unit being configured to cause the volume of said working chamber filled with a damping medium to change in response to a deflection of said hydraulic bearing;
   a partition unit disposed between said working chamber and said compensating chamber;
   said partition unit including a plurality of discs defining respective planes and being stacked one atop the other and said discs having respective channel segments disposed in corresponding ones of said planes;
   said channel segments conjointly defining a connecting channel connecting said working chamber with said compensating chamber with said channel segments communicating one with the other;
   said annular connecting pieces having respective vertical structural elevations;
   said partition unit being arranged within said vertical structural elevation of said annular rubber-elastic spring and the vertical structural elevation of one of said annular connecting pieces;
   said one annular connecting piece having an end facing away from said partition unit;
   said partition unit being disposed within said one annular connecting piece so as to cause said compensating chamber to be configured between said partition unit and said end of said one annular connecting piece; and,
   said compensating chamber having a constant volume and being entirely surrounded in a radial direction by said one annular connecting piece.

15. The hydraulic bearing of claim 14, wherein said discs conjointly define a rotational axis and are mounted so as to be shiftable angularly about said rotational axis so as to cause a change in the length of said connecting channel to adapt the damping provided by said damping medium to a particular load and frequency.

16. The hydraulic bearing of claim 14, wherein said channel segments are milled into corresponding ones of said discs from one side thereof.

17. The hydraulic bearing of claim 14, wherein said annular rubber-elastic spring is configured as a layered spring.

18. The hydraulic bearing of claim 17, wherein said spring is formed as an upwardly open hollow cone and has a plurality of rubber parts alternating with a plurality of metal parts.

\* \* \* \* \*

UNITED STATES PATENT AND TRADEMARK OFFICE
CERTIFICATE OF CORRECTION

Page 1 of 1

PATENT NO.         : 9,488,245 B2
APPLICATION NO.    : 14/452299
DATED              : November 8, 2016
INVENTOR(S)        : Volker Gedenk It is certified that error appears in the above-identified patent and that said Letters Patent is hereby corrected as shown below:

In the Specification

In Column 4:
Line 4: delete "pa" and substitute -- partition -- therefor.

Signed and Sealed this
Twenty-eighth Day of February, 2017

Michelle K. Lee
*Director of the United States Patent and Trademark Office*